(12) United States Patent
Lee et al.

(10) Patent No.: US 9,928,496 B2
(45) Date of Patent: Mar. 27, 2018

(54) GENERATING A TEMPORAL PHYSICAL PAYMENT CARD

(71) Applicant: KT CORPORATION, Gyeonggi-do (KR)

(72) Inventors: Jin-Hyoung Lee, Gyeonggi-do (KR); Youn-Pil Jeung, Gyeonggi-do (KR); Young-Bin Cho, Seoul (KR); Kook Heo, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 889 days.

(21) Appl. No.: 14/167,272

(22) Filed: Jan. 29, 2014

(65) Prior Publication Data

US 2014/0214665 A1     Jul. 31, 2014

(30) Foreign Application Priority Data

Jan. 30, 2013   (KR) ........................ 10-2013-0010442

(51) Int. Cl.
| | |
|---|---|
| *G06Q 40/00* | (2012.01) |
| *G06Q 20/22* | (2012.01) |
| *G06Q 20/34* | (2012.01) |
| *G07F 7/08* | (2006.01) |

(52) U.S. Cl.
CPC ......... *G06Q 20/227* (2013.01); *G06Q 20/351* (2013.01); *G06Q 20/353* (2013.01); *G06Q 20/3552* (2013.01); *G06Q 20/3572* (2013.01); *G07F 7/084* (2013.01)

(58) Field of Classification Search
CPC .................................................. G06Q 20/351
USPC ........................................................ 705/41
See application file for complete search history.

(56) References Cited

U.S. PATENT DOCUMENTS

| | | |
|---|---|---|
| 6,016,476 A | 1/2000 | Maes et al. |
| 6,925,439 B1 | 8/2005 | Pitroda |
| 7,375,616 B2 | 5/2008 | Rowse et al. |
| 7,395,241 B1 | 7/2008 | Cook et al. |
| 7,478,054 B1 | 1/2009 | Adams et al. |
| 7,562,818 B1 | 7/2009 | Bierbaum et al. |
| 7,793,845 B2 | 9/2010 | Bonalle et al. |
| 8,016,191 B2 | 9/2011 | Bonalle et al. |
| 8,082,349 B1 | 12/2011 | Bhargava et al. |
| 8,102,797 B2 | 1/2012 | Abel |

(Continued)

FOREIGN PATENT DOCUMENTS

| | | |
|---|---|---|
| EP | 0949595 A2 | 10/1999 |
| JP | 2002-207970 A | 7/2002 |

(Continued)

OTHER PUBLICATIONS

NFC Forum, "Type 4 Tag Operation Specification", Version 2.0, Jun. 28, 2011.

(Continued)

*Primary Examiner* — Edward Chang
(74) *Attorney, Agent, or Firm* — IP Legal Services, LLC

(57) ABSTRACT

The disclosure is related to generating a temporal physical payment card with a predetermined valid period. One of virtual payment cards stored in user equipment is selected based on a selection input received from a user. Information on the selected virtual payment card is transferred to a physical dummy payment card with a predetermined valid period.

9 Claims, 7 Drawing Sheets

(56) References Cited

U.S. PATENT DOCUMENTS

| | | |
|---|---|---|
| 8,121,945 B2 | 2/2012 | Rackley, III et al. |
| 8,332,272 B2 | 12/2012 | Fisher |
| 8,393,545 B1 | 3/2013 | Mullen et al. |
| 8,429,047 B2 | 4/2013 | Hurst |
| 8,554,653 B2 | 10/2013 | Falkenborg et al. |
| 8,744,906 B2 | 6/2014 | Fordyce, III et al. |
| 8,788,418 B2 | 7/2014 | Spodak et al. |
| 8,818,851 B2 | 8/2014 | Lee et al. |
| 8,876,011 B2 | 11/2014 | Olson et al. |
| 9,607,192 B2 | 3/2017 | Corda |
| 2001/0037254 A1 | 11/2001 | Glikman |
| 2002/0042743 A1 | 4/2002 | Ortiz et al. |
| 2002/0139843 A1 | 10/2002 | Park et al. |
| 2004/0238620 A1 | 12/2004 | Cohagan et al. |
| 2007/0138302 A1 | 6/2007 | Antoniou |
| 2007/0179885 A1 | 8/2007 | Bird et al. |
| 2008/0099556 A1* | 5/2008 | Park ............... G06K 19/07345 235/382.5 |
| 2008/0210751 A1 | 9/2008 | Kim |
| 2008/0228567 A1 | 9/2008 | Williams et al. |
| 2008/0228586 A1 | 9/2008 | Stoffelsma et al. |
| 2008/0233880 A1 | 9/2008 | Rofougaran et al. |
| 2008/0255962 A1 | 10/2008 | Chang et al. |
| 2008/0306849 A1 | 12/2008 | Johnson, Jr. et al. |
| 2009/0006218 A1 | 1/2009 | Ku et al. |
| 2009/0143104 A1 | 6/2009 | Loh et al. |
| 2009/0144164 A1 | 6/2009 | Wane et al. |
| 2009/0247078 A1 | 10/2009 | Sklovsky et al. |
| 2009/0256731 A1 | 10/2009 | Matsuo et al. |
| 2010/0030636 A1 | 2/2010 | Vijayshankar et al. |
| 2010/0078471 A1 | 4/2010 | Lin et al. |
| 2010/0078472 A1 | 4/2010 | Lin et al. |
| 2010/0082481 A1 | 4/2010 | Lin et al. |
| 2010/0153279 A1 | 6/2010 | Zahn |
| 2010/0211504 A1 | 8/2010 | Aabye et al. |
| 2010/0223111 A1 | 9/2010 | Maekawa |
| 2010/0299527 A1 | 11/2010 | Arunan et al. |
| 2010/0306080 A1 | 12/2010 | Trandal et al. |
| 2011/0016275 A1 | 1/2011 | Lemonnier et al. |
| 2011/0137994 A1 | 6/2011 | Kumar et al. |
| 2011/0184857 A1 | 7/2011 | Shakkarwar |
| 2012/0022945 A1 | 1/2012 | Falkenborg et al. |
| 2012/0059702 A1 | 3/2012 | Yoder et al. |
| 2012/0109764 A1 | 5/2012 | Martin et al. |
| 2012/0150601 A1 | 6/2012 | Fisher |
| 2012/0191612 A1* | 7/2012 | Spodak ............ G06K 19/06187 705/65 |
| 2012/0203697 A1 | 8/2012 | Morgan et al. |
| 2012/0203701 A1 | 8/2012 | Ayuso de Paul |
| 2012/0253970 A1 | 10/2012 | Ku et al. |
| 2013/0060708 A1 | 3/2013 | Oskolkov et al. |
| 2013/0086375 A1 | 4/2013 | Lyne et al. |
| 2013/0124349 A1 | 5/2013 | Khan et al. |
| 2013/0159186 A1 | 6/2013 | Brudnicki et al. |
| 2013/0238492 A1 | 9/2013 | Muthu et al. |
| 2013/0290184 A1 | 10/2013 | Shapiro et al. |
| 2013/0304561 A1 | 11/2013 | Warner et al. |
| 2013/0317924 A1 | 11/2013 | Bush et al. |
| 2013/0332356 A1 | 12/2013 | Park et al. |
| 2014/0074575 A1 | 3/2014 | Rappoport |
| 2014/0129308 A1 | 5/2014 | Rappoport |
| 2014/0136417 A1 | 5/2014 | Spodak et al. |
| 2014/0249904 A1 | 9/2014 | Nelsen et al. |
| 2014/0351048 A1 | 11/2014 | Fordyce et al. |
| 2016/0335619 A1 | 11/2016 | Ce |

FOREIGN PATENT DOCUMENTS

| | | |
|---|---|---|
| JP | 2003-281437 A | 10/2003 |
| JP | 2008-065669 A | 3/2008 |
| JP | 2011-096021 A | 5/2011 |
| KR | 10-2001-0022217 A | 3/2001 |
| KR | 10-2002-0076406 A | 10/2002 |
| KR | 10-2004-0028110 A | 4/2004 |
| KR | 10-2004-0060249 A | 7/2004 |
| KR | 10-2005-0047154 A | 5/2005 |
| KR | 10-2005-0112484 A | 11/2005 |
| KR | 10-2007-0006503 A | 1/2007 |
| KR | 10-2007-0051519 A | 5/2007 |
| KR | 10-2008-0020153 A | 3/2008 |
| KR | 10-0823679 B1 | 4/2008 |
| KR | 10-2009-0039894 A | 4/2009 |
| KR | 10-2009-0041398 A | 4/2009 |
| KR | 10-2009-0054824 A | 6/2009 |
| KR | 10-2010-0072115 A | 6/2010 |
| KR | 10-2011-0031046 A | 3/2011 |
| KR | 10-2011-0051739 A | 5/2011 |
| KR | 10-2011-0056561 A | 5/2011 |
| KR | 10-2011-0082888 A | 7/2011 |
| KR | 10-2011-0089697 A | 8/2011 |
| KR | 10-2011-0112594 A | 10/2011 |
| KR | 10-2011-0115264 A | 10/2011 |
| KR | 10-2011-0125848 A | 11/2011 |
| KR | 10-2012-0002136 A | 1/2012 |
| KR | 10-2012-0064206 A | 6/2012 |
| KR | 10-1168272 B1 | 8/2012 |
| KR | 10-2012-0097157 A | 9/2012 |
| KR | 10-2012-0098978 A | 9/2012 |
| KR | 10-1265574 B1 | 5/2013 |
| WO | 2010/039337 A2 | 4/2010 |

OTHER PUBLICATIONS

Wikipedia, "Graphical user interface", https://en.wikipedia.org/wiki/Graphical_user_interface, Dec. 1, 2005.

* cited by examiner

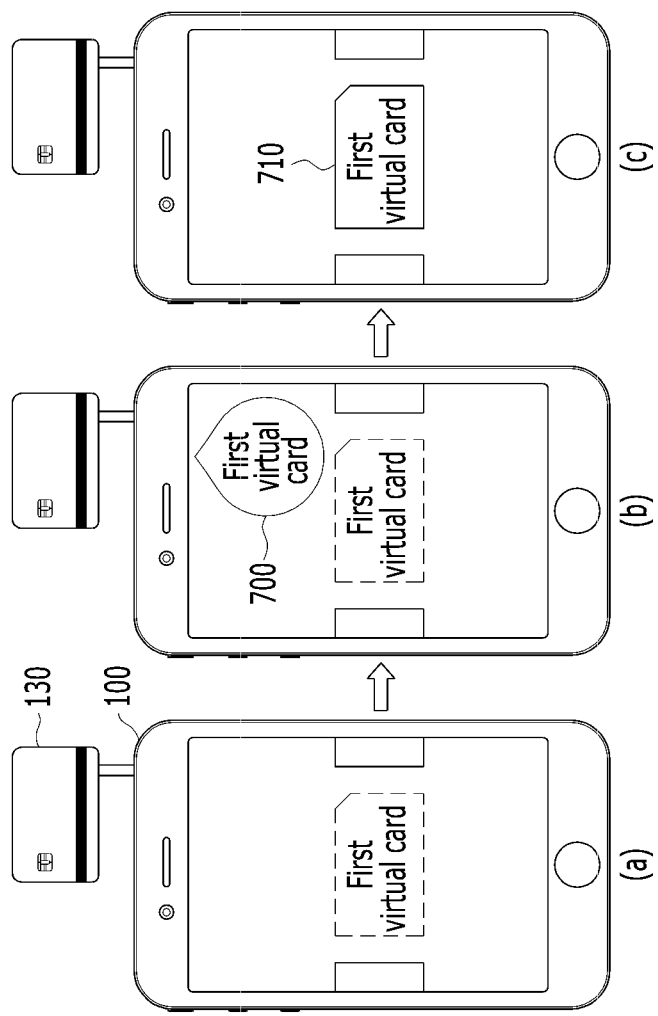

GENERATING A TEMPORAL PHYSICAL PAYMENT CARD

CROSS REFERENCE TO PRIOR APPLICATIONS

The present application claims priority under 35 U.S.C. § 119 to Korean Patent Application No. 10-2013-0010442 (filed on Jan. 30, 2013), which is hereby incorporated by reference in its entirety.

BACKGROUND

The present disclosure relates to generating a temporal physical payment card based on a virtual payment card stored in user equipment. Due to advanced mobile communication technologies, various types of methods for making a payment using a mobile device have been introduced. For example, a user stores multiple virtual payment cards in a mobile device supporting near field communication (NFC) and quick response (QR) code. Such a user can make a payment using one of the stored virtual payment cards using the NFC based payment method or the QR code based payment method.

The NFC based payment method is a contactless payment method. That is, the user can make a payment by transmitting information on a selected virtual payment card to a payment terminal through NFC. For example, the payment terminal reads data stored in an NFC tag included in the mobile device with an NFC reader. The QR based mobile payment method is also a contactless payment method. That is, the user can generate a QR code based on a selected virtual payment card and displays the generated QR code. A payment terminal scans the displayed QR code and process a payment based on payment information contained in the displayed QR code. However, many typical payment terminals do not support such NFC features and QR code features.

SUMMARY

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present embodiment, a temporal physical payment card may be generated with a predetermined valid period.

In accordance with another aspect of the present embodiment, information on a virtual payment card stored in user equipment may be transferred to a physical dummy payment card with a predetermined valid period.

In accordance with at least one embodiment, a method may be provided for generating a temporal physical payment card with a predetermined valid period by user equipment. The method may include obtaining information on a virtual payment card stored in the user equipment and selected based on a selection input received from a user and transferring the obtained information on the selected virtual payment card to a physical dummy payment card upon generation of a predetermined event.

The obtaining information may include collecting information on virtual payment cards stored in the user equipment, displaying images of the stored virtual payment cards on a display based on the collected information, receiving the selection input for selecting at least one of the displayed virtual payment card images, and retrieving information on the selected virtual payment card image from a memory of the user equipment.

The collecting information may be initiated by activating an associated application installed in the user equipment. The information on a virtual payment card may include at least one of a virtual payment card image, an associated payment card account number, an expiration date, a security code, an issuer's name, and an issuer's server address.

The transferring the obtained information may include determining whether the physical dummy payment card is coupled to the user equipment, displaying a message informing a user of disconnection of the physical dummy payment card when the physical dummy payment card is not coupled, and performing the transferring the obtained information to the physical dummy payment card when the physical dummy payment card is coupled.

The transferring the obtained information may include determining whether the physical dummy payment card stores any virtual payment card information and transmitting a control signal for erasing stored virtual payment card information to the physical dummy payment card when the physical dummy payment card stores virtual payment card information.

The transferring the obtained information may include determining whether the physical dummy payment card stores any virtual payment card information, producing and displaying a graphic user interface that asks a user whether to replace the stored virtual payment card information with others, transmitting a control signal for erasing stored virtual payment card information to the physical dummy payment card when receiving a user input for replacing the stored virtual payment card information, and transferring the obtained information to the physical dummy payment card.

The method may further include performing an authentication process by producing and displaying a graphic user interface for asking a user to enter authentication information. The method may further include setting a valid period of the transferred virtual payment card information in response to a user input.

The setting a valid period may include producing and displaying a graphic user interface that enables a user to select one of preset valid periods and to enter a customized valid period.

The method may further include transmitting a control signal for erasing the transferred virtual payment card information to the physical dummy payment card when a valid period of the transferred virtual payment card information expires.

The method may further include interrupting supplying power to the physical dummy payment card when a valid period of the transferred virtual payment card information expires.

In accordance with at least one embodiment, user equipment may be provided for generating a temporal physical payment card with a predetermined valid period. The user equipment may include an input/output circuit configured to receive user inputs from a user and to output graphic user interfaces produced as a result of executing applications in response to the received user inputs, a memory configured to store and manage information on virtual payment cards, an interface circuit configured to be coupled to a physical dummy payment card and to transfer information on at least one virtual payment card to the physical dummy payment card, and a processor configured to obtain information on a virtual payment card stored in the memory and selected based on a selection input received from a user through the input/output circuit and to transfer the obtained information on the selected virtual payment card to the physical dummy payment card upon generation of a predetermined event.

In accordance with at least one embodiment, a dummy card may be provided for receiving information on a selected virtual payment card from user equipment. The dummy card may include an interface circuit, a smart card chip, and a magnetic data output controller. The interface circuit may be configured to be coupled to the user equipment and to receive virtual payment card information with a predetermined valid period from the user equipment. The smart card chip may be configured to receive and store the virtual payment card information in an electric signal form and to transmit the stored virtual payment card information to a payment terminal through a plurality of contacts. The magnetic data output controller may be configured to receive and store the virtual payment card information in a magnetic data form and to transmit the stored virtual payment card information to the payment terminal through a magnetic data output member.

The interface circuit may be configured to demodulate the received virtual payment card information and to provide the demodulated virtual payment card information to at least one of the smart card chip and to the magnetic data output controller.

The smart card chip includes a memory. The smart card may be configured to store the virtual payment card information in the memory for the predetermined valid period associated with the virtual payment card information.

The smart card chip includes a non-volatile memory. In this case, the smart chard chip may be configured to receive a control signal from the user equipment and to erase the stored virtual payment card information in response to the control signal.

The smart card chip includes a volatile memory. In this case, the smart card chip may be configured to store the received virtual payment card information while electric power is supplied from the user equipment The magnetic data output controller may include a memory. The magnetic data output controller may be configured to store the virtual payment card information in the memory for the predetermined valid period associated with the virtual payment card information.

The magnetic data output end may be configured as a magnetic strip. The magnetic data output controller may be configured to write the received virtual payment card information to the magnetic strip and to erase the virtual payment card information from the magnetic strip.

The magnetic data output end may be configured as a magnetic strip. In this case, the magnetic data output controller may be configured to erase the virtual payment card information stored in the magnetic strip when the valid period associated with the virtual payment card information expires. In addition, the magnetic data output controller may be configured to erase the virtual payment card information stored in the magnetic strip in response to a control signal from the user equipment.

BRIEF DESCRIPTION OF THE DRAWINGS

The above and/or other aspects of the present invention will become apparent and more readily appreciated from the following description of embodiments, taken in conjunction with the accompanying drawings, of which:

FIG. 7 illustrates expiration of a valid period of a virtual payment card stored in a physical dummy payment card in accordance with at least one embodiment.

DESCRIPTION OF EMBODIMENTS

Figure 1:
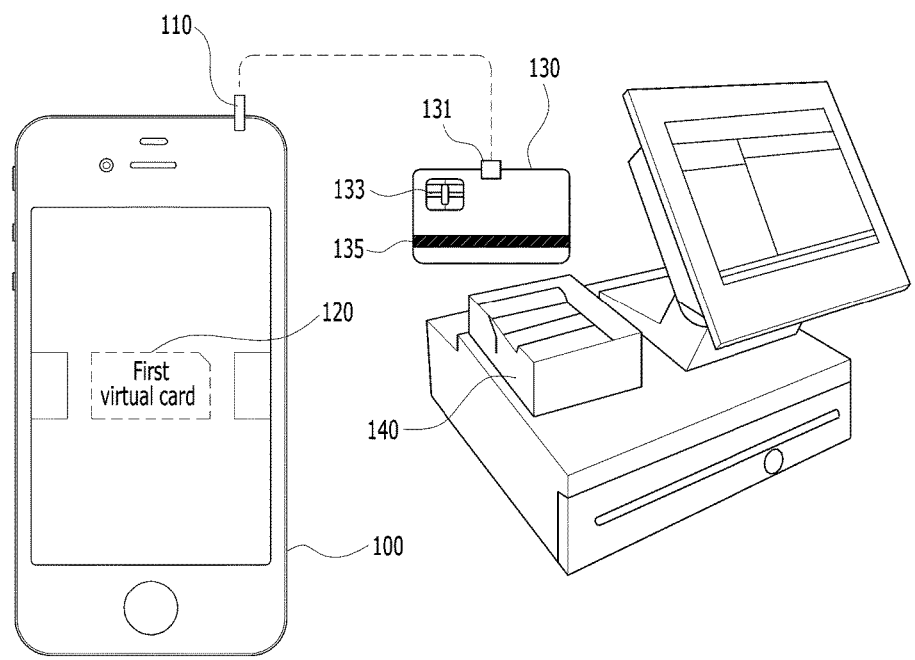
FIG. 1 illustrates user equipment for generating a temporal physical payment card in accordance with at least one embodiment.

Reference will now be made in detail to embodiments of the present invention, examples of which are illustrated in the accompanying drawings, wherein like reference numerals refer to like elements throughout. The embodiments are described below, in order to explain the present invention by referring to the figures.

In accordance with at least one embodiment, a temporal physical payment card may be generated with a predetermined valid period by transferring information on a selected virtual payment card stored in user equipment from the user equipment to a physical dummy payment card. Hereinafter, user equipment for generating a temporal physical payment card will be described with reference to FIG. 1.

FIG. 1 illustrates user equipment for generating a temporal physical payment card in accordance with at least one embodiment.

Referring to FIG. 1, user equipment 100 generates a temporal physical payment card with a predetermined valid period by transferring information on a virtual payment card stored in user equipment 100 to physical dummy payment card 130 with a predetermined valid period. Like a typical payment card, a consumer may use such temporal physical payment card 130 to make a payment for purchasing a good or a service from a merchant or a service provider instead of using a virtual payment card stored in user equipment 100 in connection with payment terminal 140 although payment terminal 140 does not support near field communication (NFC) or include a code pattern reader.

As described, user equipment 100 generates a temporal physical payment card (e.g., physical dummy payment card 130) based on a virtual payment card stored in a memory of user equipment 100 in accordance with at least one embodiment. Such user equipment 100 may be electronic device having processing power, a memory, and communication capability. For example, user equipment 100 may include a personal computer (PC), a smartphone, a laptop computer, a personal digital assistance (PDA), and a portable multimedia player (PMP). The present invention, however, is not limited thereto.

Such operation may be performed by application software (e.g., App) installed in and executed by user equipment 100.

However, the present invention is not limited thereto. The application software may be downloaded from an associated server and installed in user equipment. The application software may be executed by activating an icon displayed with a default graphic user interface (e.g., home screen) of user equipment 100. The application software may produce a graphic user interface that shows a plurality of virtual payment cards stored in user equipment 100 and enables a user to select at least one of virtual payment cards and to transfer information on the selected virtual payment card to a physical dummy payment card in order to generate a physical payment card with a predetermined valid period. Such graphic user interface and operation thereof will be described with reference to FIG. 3 to FIG. 7.

A virtual payment card may be a digital form of a typical payment card such as a credit card, a debit card, and a gift card. The virtual payment card may be issued to a user through user equipment 100 from an associated server and stored digitally in user equipment 100. User equipment 100 may receive information on physical payment cards directly from a user or from an associated server through a communication network. User equipment 100 stores and manage the received payment card information as virtual payment cards using a dedicated application software (e.g., App). That is, user equipment 100 stores information on payment instruments, manages the stored information as virtual payment cards, and displays associated payment card images of the stored information as the virtual payment cards. The virtual payment card may contain similar information stored in a magnetic strip of a typical plastic payment card. User equipment 100 stores and manages at least one of virtual payment cards.

User equipment 100 enables a user to use a virtual payment card to make a payment for purchasing a good or a service from a merchant or a service provider. For example, user equipment 100 displays a graphic user interface on a touch screen thereof as a result of executing associated application software stored in user equipment 100 in response to a user input. Through the graphic user interface, user equipment 100 shows images of stored virtual payment cards and enables a user to select one of the virtual payment cards by touching an associated image thereof. The virtual payment card may include various types of payment cards in a digital form. For example, the virtual payment card includes a credit card, a debit card, a gift card, a prepaid card, a store card, a reward card, a cash card, and so forth.

Physical dummy payment card 130 may be coupled to user equipment 100 through predetermined output terminal 110 of user equipment 100, receive virtual payment card information from user equipment 100 through output terminal 110, and store the received virtual payment card information for a predetermined valid period in accordance with at least one embodiment. Such physical dummy payment card 130 may be used for making a payment for a good or a service for the predetermined valid period in connection with payment terminal 140.

Physical dummy payment card 130 includes magnetic strip 133 and a plurality of contacts 135. Magnetic strip 133 and plurality of contents 135 may store the received virtual payment card information for a predetermined valid period. Particularly, magnetic strip 133 may be configured to store the virtual payment card information by modifying magnetism of tiny iron-based magnetic particles on a band of magnetic material. Such magnetic strip 133 may be scanned by an associated scanner or reader of payment terminal 140 and transferred the stored virtual payment card information to payment terminal 140. The plurality of contacts 135 may be configured to be coupled with a smart card chip having a memory storing the virtual payment card information digitally and output the virtual payment card information in an electric signal form to payment terminal 140. The storages of physical dummy payment card 130 may be a volatile or nonvolatile memory implemented by semiconductor circuits, or a magnetic strip on which data is recorded in a magnetic signal form.

Payment terminal 140 may scan or read virtual payment card information from physical dummy payment card 130 and perform a payment procedure based on virtual payment card information stored in physical dummy payment card 130. Such payment terminal 140 may be a Point of Sale (POS) terminal or a credit card terminal located at an offline store. Payment terminal 140 may scan or read magnetic strip 133 and/or contacts 135 and obtain the virtual payment card information stored magnetic strip 133 and/or contacts 135.

As described, user equipment 100 transfers a selected one of stored virtual payment card information with a predetermined valid period to physical dummy payment card 130. Thus, an associated user may be able to make a payment for purchasing a good or a service from a merchant using physical dummy payment card 130 in connection with payment terminal 140 of the merchant although payment terminal 140 is incapable of scanning and reading virtual payment cards stored in user equipment 100 or incapable of communicating with user equipment 100 to receive virtual payment card information from user equipment 100. Such operation may be performed by executing dedicated application software installed in user equipment 100. Hereinafter, such an operation of user equipment 100 will be described with reference to FIG. 2.

Figure 2:
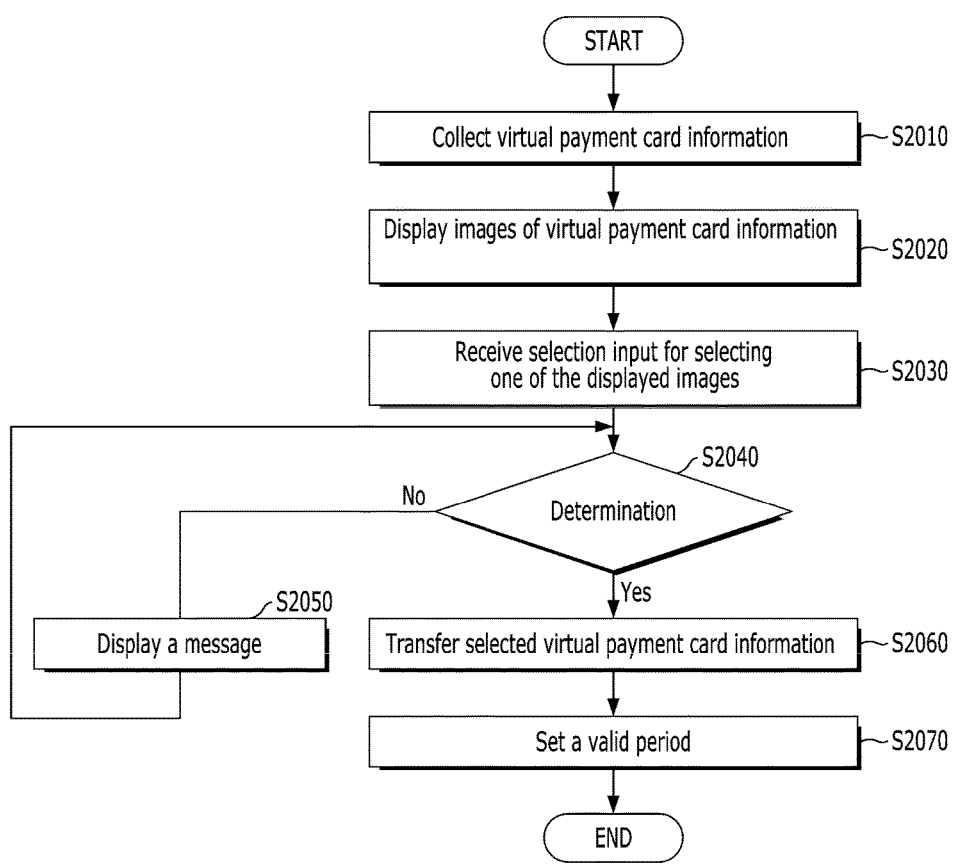
FIG. 2 illustrates a method of generating a temporal physical payment card based on a virtual payment card stored in user equipment in accordance with at least one embodiment.

FIG. 2 illustrates a method of generating a temporal physical payment card based on a virtual payment card stored in user equipment in accordance with at least one embodiment.

Referring to FIG. 2, information on virtual payment cards is collected at step S2010. For example, such a collection operation may be initiated upon the generation of a predetermined event. The predetermined event may include activating an icon of dedicated application software, which is displayed within a default graphic user interface (e.g., home screen) of user equipment 100, but the present invention is not limited thereto. Upon the generation of such event, user equipment 100 collects information on virtual payment cards issued at or stored in user equipment 100. Such virtual payment card information may include a virtual payment card image, an associated payment card account number, an expiration date, a security code, an issuer's name, an issuer's server address, and so forth.

At step S2020, images of virtual payment cards are displayed in a predetermined manner to enable an associated user to select one of the virtual payment cards. For example, user equipment 100 displays virtual payment card images of the collected virtual payment card information on a display (e.g., touch screen). Particularly, the executed application software produces a graphic user interface that shows images of the virtual payment cards stored in user equipment 100 based on the collected virtual payment card information. The produced graphic user interface may include user interactive menus and icons to enable the associated user to select one of virtual payment cards and to transfer information on the selected virtual payment card to physical dummy payment card 130.

The graphic user interface may show the virtual payment card images in various manners. For example, the virtual payment cards image may be displayed in a scrollable manner in a top-to-bottom direction, a bottom-to-top direction, a right-to-left direction, or a left-to-right direction lateral direction. Furthermore, some virtual payment card images may be displayed differently from others. For example, if a virtual payment card has information that had been transferred to physical dummy payment card 130, an image of such virtual payment card may be displayed with a bold edge, a highlight edge, a different color, or a transparent image. The present invention, however, is not limited thereto. Such display schemes will be described with reference to FIG. 4 to FIG. 7.

At step S2030, a selection input is received. For example, based on the displayed virtual payment card images, an associated user selects one of the displayed virtual payment card images and make a touch input on the selected virtual payment card image. In response to such a selection input, user equipment 100 selects one of the displayed virtual payment card images.

At step S2040, determination is made so as whether a physical dummy payment card is ready to receive information. For example, user equipment 100 determines whether physical dummy payment card is coupled to output terminal 110. Physical dummy payment card 130 may be coupled to user equipment 100 through a cable for transferring and receiving electric signals to store information in storages of physical dummy payment card 130 or through a device for writing information in magnetic strip 133. The electric signals may include digital signals and analog signals. User equipment 100 may include output terminals (e.g., earphone jack or RGB port) configured to transmit analog signals and/or output terminals (e.g., USB or HDMI) configured to output digital signals. User equipment 100 may include an internal device or be attached with an external device for writing information in magnetic strip 133. The present invention, however, is not limited thereto.

When the physical dummy payment card is not ready (No—S2040), a predetermined message is displayed at S2050. For example, when the physical dummy payment is not coupled or is not detected, user equipment 100 displays a message informing of a user that physical dummy payment card 130 is not coupled or a message asking a user to connect the physical dummy payment card 130 to user equipment 100.

When the physical dummy payment card is ready (Yes—S2040), the selected virtual payment card information is transferred to the physical dummy payment card at step S2060. For example, user equipment 100 transfers the virtual payment card information of the selected virtual payment card to physical dummy payment card 130. The virtual payment card information may have a digital data size from several bytes to several kilobytes. Such virtual payment card information may be transferred to physical dummy payment card 130 in sufficiently short time.

Particularly, user equipment 1001) determines an output terminal coupled to physical dummy payment card 130, ii) processes the selected virtual payment card information to a predetermined data format, and iii) transfers the processed virtual payment card information to physical dummy payment card 130. Alternatively, user equipment 100 may write the processed virtual payment card information in magnetic strip 133 of physical dummy payment card 130 using a predetermined external device attached at output terminal 110.

Before transferring the information on the selected virtual payment card, user equipment 100 may perform an authentication procedure. For example, user equipment 100 may produce a graphic user interface for asking an associated user to enter authentication information such as a pin number. Only if the user enters authentication information matched with authentication information registered with the associated virtual payment card, user equipment 100 performs transferring the selected virtual payment card information.

At step S2070, a predetermined valid period is set. For example, user equipment 100 sets a valid period of the virtual payment card information transmitted to physical dummy payment card 130 based on a user input. Such a valid period denotes a time period for physical dummy payment card 130 to store the transferred virtual payment card information. Upon the expiration of the valid period, the transferred virtual payment card information may be erased or corrupted automatically. Alternatively, user equipment 100 may transfer a termination command to physical dummy payment card 130 to erase the virtual payment card information or may cut off power supplied to physical dummy payment card 130. In this manner, the virtual payment card information stored in physical dummy payment card 130 may be provided to payment terminal 140 only within the valid period.

After setting up the valid period for the transferred virtual payment card information, physical dummy payment card 130 may provide the transferred virtual payment card information to payment terminal 140 only for the valid period. That is, payment terminal 140 might read the virtual payment card information from magnetic strip 133 or contacts 135 for the valid period.

As described above, user equipment 100 transfers information on a selected virtual payment card to physical dummy payment card 130 with a predetermined valid period. Such user equipment 100 and physical dummy payment card 130 will be described with reference to FIG. 3.

Figure 3:
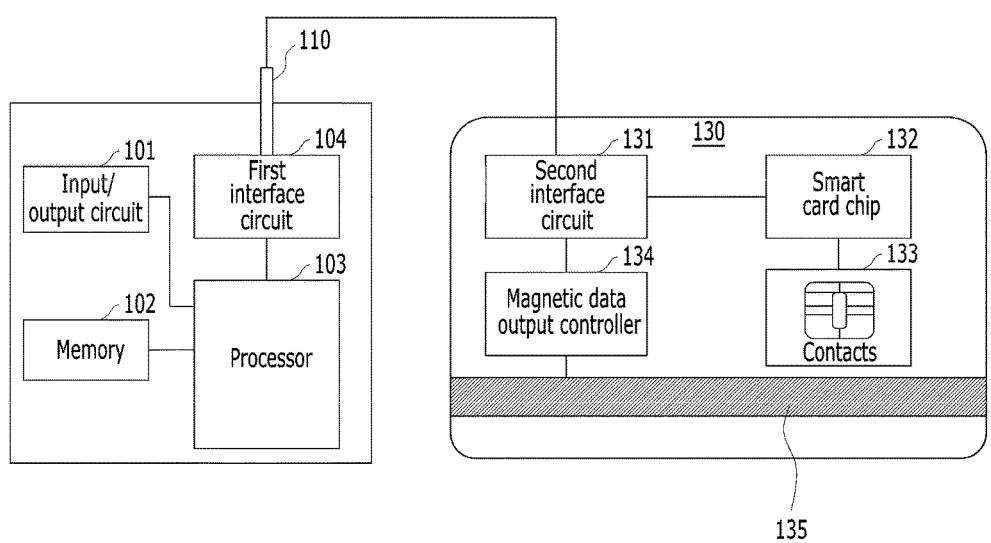
FIG. 3 illustrates user equipment and a physical dummy payment card in accordance with at least one embodiment.

FIG. 3 illustrates user equipment and a physical dummy payment card in accordance with at least one embodiment. Referring to FIG. 3, user equipment 100 may include input/output circuit 101, memory 102, processor 103, first interface circuit 104, and output terminal 110.

Input/output circuit 101 receives various types of inputs from a user and output a result of processing based on the received inputs. For example, input/output circuit 101 may receive various types of commands for controlling constituent elements of user equipment 100 from a user and display various types of information generated as a result of processing the received inputs in various formats.

Particularly, input/output circuit 101 receives touch inputs from a user through a predetermined graphic user interface displayed on input/output circuit 101. Furthermore, input/output circuit 101 outputs the result of processing based on the received touch input through the predetermined graphic user interface. In accordance with at least one embodiment, input/output circuit 101 displays a graphic user interface for showing a plurality of virtual payment cards stored in user equipment 100, for enabling a user to select at least one of the virtual payment cards, for enabling a user to transfer the selected virtual payment card to physical dummy payment card 130, and for setting up a valid period of the transferred virtual payment card.

Input/output circuit 101 may include a display panel for displaying information, such as a liquid crystal display (LCD), and a touch sensor panel for sensing touch inputs. Such input/output circuit 101 may be referred to as a touch screen. Since such a touch screen and its operation are well known to those skilled in the art, the detailed descriptions thereof are omitted herein. In FIG. 3, user equipment 100 is illustrated as having input/output circuit 101 as one integrated input/output circuit, but the present invention is not limited thereto. User equipment 100 may include various types of input circuits (e.g., keypad, buttons, and sensors) separated from output circuits (a flat panel display).

Memory 102 stores various types of software programs including an operating system for controlling user equipment 100 and at least one application necessary for selecting and transferring at least one virtual payment card from user equipment 100 to physical dummy payment card 130. Furthermore, memory 120 stores various types of data generated during performing operations in user equipment 100. Memory 102 stores and manages virtual payment card information of virtual payment cards. In response to a selection input received through input/output circuit 101, information on the selected virtual payment card is read from memory 102.

Processor 103 is central processing circuitry that controls constituent elements of user equipment 100 (e.g., input/output circuit 101, memory 102, first interface circuit 150, and output terminal 110) based on inputs received through input/output circuit 101 or based on results of performing operations associated with the service.

In accordance with at least one embodiment, processor 103 may perform an operation for producing various types of graphic user interfaces, as a result of executing applications, and for displaying the produced graphic user interfaces on input/output circuit 101. For example, processor 103 may perform operations for displaying images of stored virtual payment cards and for enabling a user to select and transfer one of the stored virtual payment cards. Furthermore, processor 140 may perform an operation for detecting a user input through input/output circuit 101 and moving a virtual card image along the detected user input.

Processor 103 may perform an operation for initiating an application for selecting and transferring a virtual payment card to physical dummy payment card 130 upon a predetermined event. For example, processor 140 may produce a graphic user interface, as a result of initiating and executing the application, for displaying at least one virtual payment card image on input/output circuit 101, for enabling a user to select one of the virtual payment card images, for dragging a selected virtual payment card image along a dragging input made by a user, and for displaying a selected virtual payment card image differently from others. Such operation will be described more detail with reference to FIG. 4 to FIG. 7.

Processor 103 may perform an authentication operation upon the detection of a user input for transferring virtual payment card information to physical dummy payment card 130. For example, when processor 130 detects dragging of the selected virtual payment card image reaching a predetermined area close to output terminal 110, processor 130 may initiate the authentication operation. As the authentication operation, processor 130 produces a graphic user interface for asking the associated user to enter predetermined authentication information such as a personal identification number (pin) number. Such predetermined authentication information may be set by a user, but the present invention is not limited thereto. For example, a user may set different authentication information to each virtual payment card or set the same authentication information for all virtual payment cards stored in user equipment 100. When the user enters authentication information identical to registered authentication information of a selected virtual payment card, processor 103 approves the transfer of the selected virtual payment card information.

Processor 103 may perform an operation for setting a valid period of the virtual payment card information of the selected virtual payment card. For example, processor 130 may produce a graphic user interface for enabling a user to select one of multiple valid periods or to set a custom valid period.

Processor 103 may perform an operation for managing information on a virtual payment card transferred to and stored in physical dummy payment card 130. Such information may be used to discriminate the transferred virtual payment card from others. In order to transfer new virtual payment card to physical dummy payment card 130, processor 103 may generate a control signal for erasing the virtual payment card information stored in physical dummy payment card 130 and transmit the generated control signal to physical dummy payment card 350. In response to such a control signal, physical dummy payment card 130 erases the virtual payment card information stored in storages of smart card chip 132 and magnetic data output controller 134.

Processor 103 may perform an operation for controlling data transmission to physical dummy payment card 130 and managing an operating status of physical dummy payment card 130. For example, processor 103 performs operations for transferring selected virtual payment card information to physical dummy payment card when a user enters authentication information matched with registered authentication information.

In addition, processor 103 may perform an operation for determining whether physical dummy payment card 130 stores any virtual payment card information by communicating with physical dummy payment card 130. For example, when physical dummy payment card 130 is initially coupled to user equipment 100, processor 103 may determine what virtual payment card information has been stored in physical dummy payment card 130. The result may be transferred to processor 103. Based on the result, processor 103 may decide an operation to be performed.

Processor 103 may erase virtual payment card information stored in physical dummy payment card 130 when physical dummy payment card 130 is initially coupled to user equipment 100 or in response to a request. Processor 103 may interrupt supplying power to physical dummy payment card 130 or transmit a control signal for erasing the virtual payment card information to physical dummy payment card 130.

First interface circuit 105 provides a path for transferring the selected virtual payment card information to physical dummy payment card 130 through output terminal 110. First interface circuit 105 communicates with physical dummy payment card 130 through a link established between first interface circuit 105 and second interface circuit 131 of physical dummy payment card 130. Such a link may be a cable, but the present invention is not limited thereto. First interface circuit 105 modulates the virtual payment card information into a predetermined transferable format and transmits the modulated virtual payment card information to second interface circuit 131 through output terminal 110.

Furthermore, first interface circuit 105 may supply power to physical dummy payment card 130 through a cable. In addition, interface circuit 105 may transfer control commands, such as a command for erasing virtual payment card information stored in physical dummy payment card 130, through the cable coupled to physical dummy payment card 130. In response to such command, physical dummy payment card 130 erases virtual payment card information stored in storages of smart card chip 132 and magnetic data output controller 134.

Physical dummy payment card 130 may include second interface circuit 131, smart card chip 132, contacts 133, magnetic data output controller 134, and magnetic data output member 135. Although physical dummy payment card 130 is illustrated as including smart card chip 132 and contacts 133, the present invention is not limited thereto. For example, smart card chip 132 and contacts 133 may be omitted from physical dummy payment card 130 in accordance with another embodiment.

Second interface circuit 131 may be coupled to first interface 105 of user equipment 100 and receives virtual payment card information from user equipment 100. Second interface circuit 131 demodulates the received virtual payment card information in accordance with a modulation scheme corresponding to the modulation scheme of interface circuit 105 of user equipment 100. The demodulated virtual payment card information is provided to smart card chip 132 and/or magnetic data output controller 134.

Smart card chip 132 receives the demodulated virtual payment card information from second interface circuit 131. Smart card chip 132 includes a storage configured to store the received virtual payment card information. Such storage may be a nonvolatile memory or a volatile memory. Smart card chip 132 may be supplied with driving power through second interface circuit 131. Smart card chip 132 may transmit the stored virtual payment card information in an electric signal to payment terminal 140 through contacts 133.

Smart card chip 132 stores the virtual payment card information in a memory thereof until an associated valid period expires. Furthermore, smart card chip 132 may receive a control signal from user equipment 100 and erase the stored virtual payment card information from the memory in response to the control signal. When the memory is a volatile memory, smart card chip 132 stores the virtual payment card information while electric power is supplied from user equipment 100. Accordingly, a user can use physical dummy payment card 130 as a payment card only for a predetermined time period.

Magnetic data output controller 134 receives the demodulated virtual payment card information from second interface circuit 131. Magnetic data output controller 134 also includes a storage configured to store the virtual payment card information. The storage of magnetic data output controller 134 may be a nonvolatile memory or a volatile memory.

Magnetic data output controller 134 outputs the virtual payment card information in a magnetic data form through magnetic data output member 135. Magnetic data output member 135 may be realized as a magnetic strip. In this case, the virtual payment card information is recorded in the magnetic strip by modifying the magnetism of iron-based magnetic particles on a band of magnetic material (e.g., in a magnetic signal form). Furthermore, magnetic data output controller 134 may record the virtual payment card information in the magnetic strip and erase the virtual payment card information from the magnetic strip. The present invention is not limited thereto. For example, information on a selected virtual payment card information may be recorded in the magnetic strip by an external device (e.g., code writer) attached to user equipment 100. In addition, magnetic data output member 135 may be realized as a converter. In this case, magnetic data output controller 134 may control converter to output the received virtual payment card information in the magnetic signal form one time or repeatedly.

Magnetic data output controller 134 erases virtual payment card information stored in the memory thereof or the magnetic strip upon generation of a predetermined event. For example, magnetic data output controller 134 erases virtual payment card information stored in the memory or recorded in the magnetic strip when magnetic data output controller 134 receives a predetermined control signal from user equipment 100 or when a valid period associated with the virtual payment card information expires. Accordingly, a user can use physical dummy payment card 130 as a payment card only for a predetermined time period.

Such physical dummy payment card 130 may be carried by each individual with user equipment 100. When it is needed, an individual transfers the selected virtual payment card information to the storages of smart card chip 132 and/or magnetic data output controller 134 with a valid period set. For example, when a payment terminal of a merchant does not support a payment procedure through NFC or using a QR code, an individual might transfer the selected virtual payment card information to physical dummy payment card 130 with a short valid period. Or, when an individual is planning to have a long shopping day, such an individual might set the valid period with a longer time period for repeatedly using physical dummy payment card 130 after transferring the selected virtual payment card information from user equipment 100 to physical dummy payment card 130. In these cases, the storages of magnetic data output controller 134 and smart card chip 132 may be realized as non-volatile memory for holding the stored data in a comparatively long term.

Such physical dummy payment card 130 may be prepared by a merchant at an associated store and allowed to customers for sharing. That is, when a customer does not have an own physical dummy payment card, such a customer might borrow one prepared by the merchant at the store. In this case, the storages of smart card chip 132 and magnetic data output controller 134 may be realized as a volatile memory for storing the transferred virtual payment card information at very short time. That is, the stored virtual payment card information is erased when physical dummy payment card 130 is disconnected from user equipment 100.

As described, one of virtual payment cards stored in user equipment is transferred to a physical dummy payment card and the physical dummy payment card is used to make a payment when a payment terminal of a merchant does not support a NFC based payment procedure or a code pattern payment procedure using a user equipment. Hereinafter, such an operation will be described in detail with reference to FIG. 4 to FIG. 7.

Figure 4:
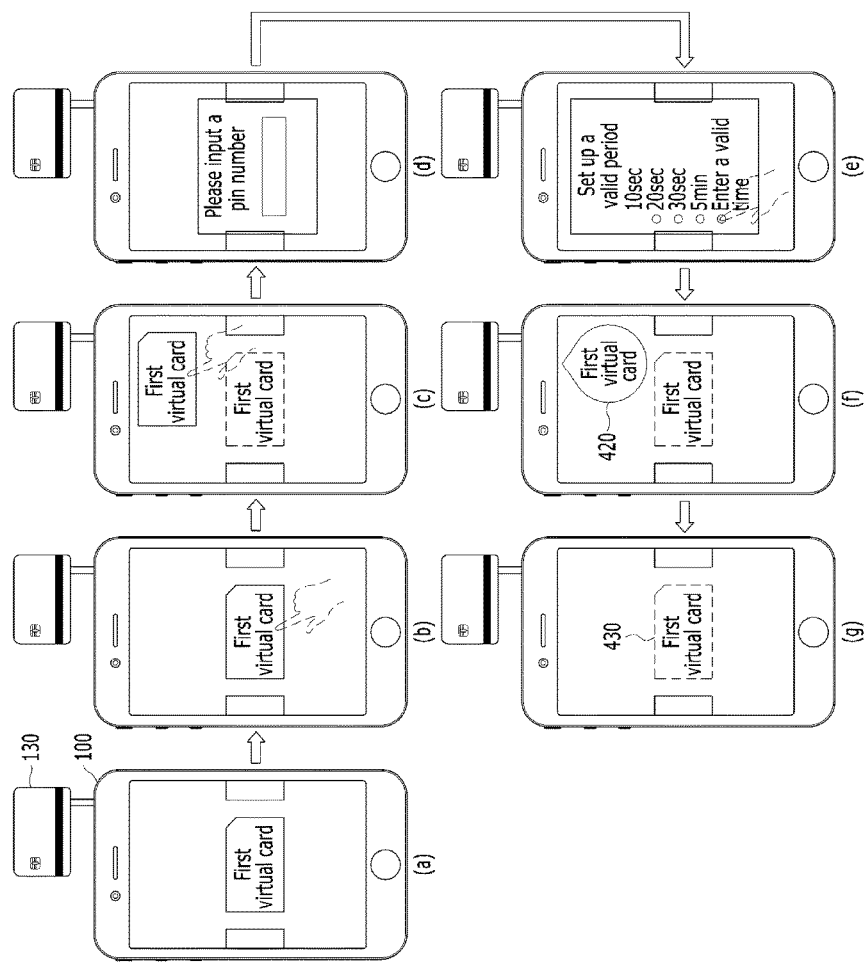
FIG. 4 illustrates selecting and transferring virtual payment card information to a physical dummy payment card in accordance with at least one embodiment.

FIG. 4 illustrates selecting and transferring virtual payment card information to a physical dummy payment card in accordance with at least one embodiment.

Referring to a diagram (a) of FIG. 4, user equipment 100 initiates application for transferring virtual payment card information to physical dummy payment card 130 upon predetermined events, for example, when physical dummy payment card 130 is coupled to user equipment 100 or when an associated icon is activated by a user input. Then, user equipment 100 collects information on stored virtual payment cards, produces a graphic user interface for displaying images of collected virtual payment card information in a later scrollable manner, and displays the produced graphic user interface.

Referring to a diagram (b) of FIG. 4, the produced graphic user interface also enables an associated user to select one of the displayed virtual payment card images by making a touch input on one of the displayed virtual payment card images. For example, the user selects a first virtual card by making a touch input on an image of the first virtual card as shown in the diagram (b) of FIG. 4.

Referring to a diagram (c) of FIG. 4, the user drags or flicks the selected virtual payment card image to output terminal 110 where physical dummy payment card 130 is coupled to. Such dragging input initiates an operation for transferring information on the selected virtual payment card to physical dummy payment card 130. For example, when the dragged virtual payment card image reaches at a certain area close to output terminal 110, an edge of the selected virtual payment card image is started to be displayed by a dashed line as shown in the diagram (c) of FIG. 4. Such displaying manner might be a feedback of the dragging input. That is, such displaying manner enables the user to indicate the initiation of the transferring operation and the initiation of the selected virtual payment card for transferring.

Referring to a diagram (d) of FIG. 4, upon the initiation of the transferring operation, user equipment 100 displays a graphic user interface for an authentication process. For example, user equipment 100 displays a graphic user interface that asks the user to enter a pin number (e.g., a password). The graphic user interface also enables the user to input the pin number as the authentication information.

Referring to a diagram (e) of FIG. 4, upon the entering of a correct pin number, it initiates an operation for setting up a valid period. That is, user equipment 100 displays another graphic user interface that enables a user to set up a valid period for the selected virtual payment card information. As shown in the diagram (e) of FIG. 4, the graphic user interface may include multiple valid periods that the user might choose one and include an option that might enable the user to set a customized valid period.

Referring to a diagram (f) of FIG. 4, when the user chooses one of the multiple valid period or sets the customized valid period, user equipment might display a dynamic movement of selected virtual payment card image 420 swished through physical dummy payment card 130.

Referring to a diagram (g) of FIG. 4, user equipment 100 transfers information on a virtual payment card corresponding to the selected virtual payment card image to physical dummy payment card 130. For example, user equipment 1001) reads information on a virtual payment card corresponding to the selected virtual payment card image from memory 102, ii) modulates the read information into a predetermined format through first interface circuit 104, and iii) transfer the modulated information to second interface circuit 131 of physical dummy payment card 130 through output terminal 110. Then, physical dummy payment card 130 iv) demodulates the transferred information through second interface circuit 131 and v) stores the demodulated information in the storages of magnetic data output controller 134 and/or smart card chip 132 for the set valid period.

After transferring, user equipment 100 may display the transferred virtual payment card differently from others. For example, an edge of the transferred virtual payment card image is displayed by a dotted line. As described, such displaying manner enables the user to indicate the transferred virtual payment card and to distinguish the transferred virtual payment card from others.

Figure 5:
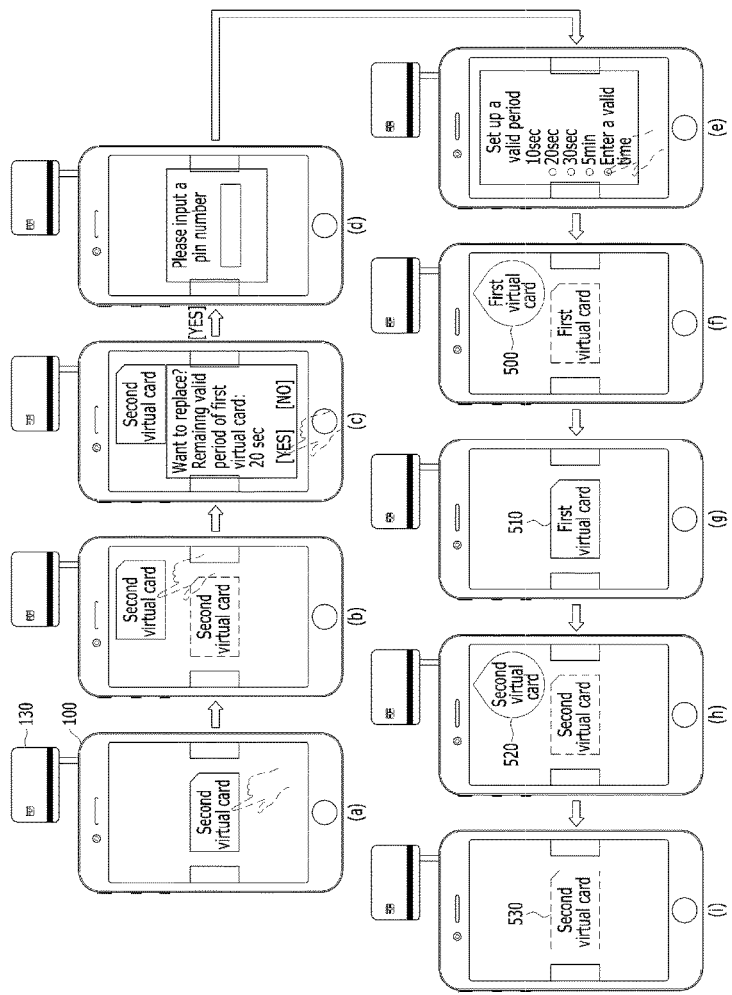
FIG. 5 illustrates replacing information on a virtual payment card stored in a physical dummy payment card with another in accordance with at least one embodiment.

FIG. 5 illustrates replacing a virtual payment card stored in a physical dummy payment card with another in accordance with at least one embodiment.

Referring to a diagram (a) of FIG. 5, after transferring the first virtual payment card information to physical dummy payment card 130, the user might select a second virtual payment card image in order to replay the first virtual payment card information with the second virtual payment card information. For example, the user makes a touch input on the second virtual payment card image as show in the diagram (a) of FIG. 5.

Referring to a diagram (b) of FIG. 5, the user drags or flicks the selected virtual payment card image to output terminal 110 where physical dummy payment card 130 is coupled to. Such dragging input initiates an operation for transferring information on the second virtual payment card to physical dummy payment card 130. For example, when the dragged virtual payment card image reaches at a certain area close to output terminal 110, an edge of the selected virtual payment card image is started to be displayed by a dashed line as shown in the diagram (b) of FIG. 5. Such displaying manner might be a feedback of the dragging input. That is, such displaying manner enables the user to indicate the initiation of the transferring operation.

As shown in a diagram (c) of FIG. 5, since the first virtual payment card information is already stored in physical dummy payment card 130, user equipment 100 may display a graphic user interface that enables a user to indicate other information stored in physical dummy payment card 130 and ask whether to replace or not (e.g., yes/no).

As shown in a diagram (d) of FIG. 5, when the user choose to replace the first virtual payment card information with the second virtual payment card information (e.g., selecting "yes"), user equipment 100 displays a graphic user interface for an authentication process. For example, user equipment 100 displays a graphic user interface that asks the user to enter a pin number (e.g., a password). The graphic user interface also enables the user to input the pin number as the authentication information.

Referring to a diagram (e) of FIG. 5, upon the entering of a correct pin number, it initiates an operation for setting up a valid period. That is, user equipment 100 displays another graphic user interface that enables a user to set up a valid period for the second virtual payment card information. As shown in the diagram (e) of FIG. 5, the graphic user interface may include multiple valid periods that the user might choose one and include an option that might enable the user to set a customized valid period.

Referring to a diagram (f) of FIG. 5, when the user chooses one of the multiple valid period or sets the customized valid period, user equipment may display dynamic movement of first virtual payment card image 500 coming out from physical dummy payment card 130.

Referring to a diagram (g) of FIG. 5, user equipment 100 may continuously display dynamic movement of first virtual payment card image entering into the dashed line edge of first virtual payment card image 510. Then, user equipment 100 displays the edge of first virtual payment card image 510 with a solid line in order to enable the user to indicate the first virtual payment card information is removed or erased from physical dummy payment card 130.

As shown in a diagram (h) of FIG. 5, user equipment 100 displays dynamic movement of second virtual payment card image 520 entering into physical dummy payment card 130. That is, user equipment 100 transfers the second virtual payment card information to physical dummy payment card 130 with the set valid period.

As shown in a diagram (i) of FIG. 5, after transferring, user equipment 100 may display the transferred virtual payment card differently from others. For example, an edge of second virtual payment card image 530 is displayed by a dotted line. As described, such displaying manner enables the user to indicate transferred second virtual payment card image 530 and to distinguish the transferred virtual payment card from others.

Figure 6:
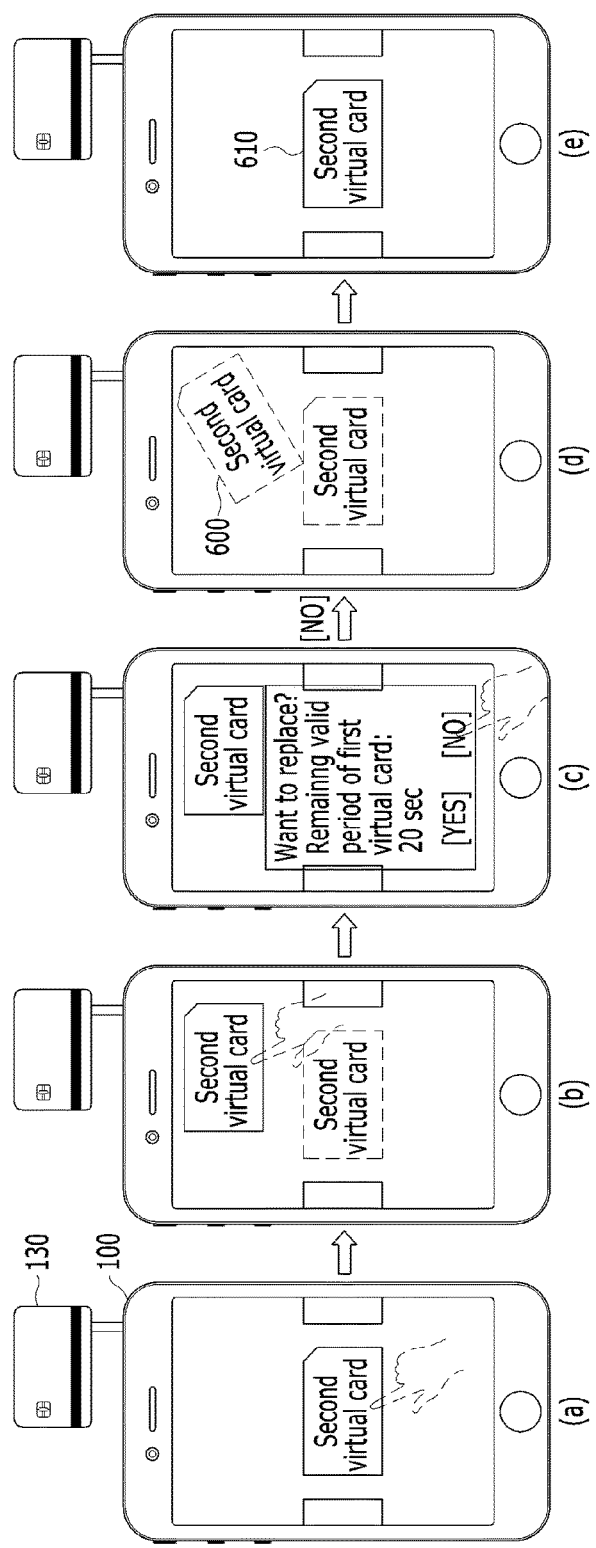
FIG. 6 illustrates replacing virtual payment card information stored in a physical dummy payment card with another in accordance with at least one embodiment.

FIG. 6 illustrates replacing virtual payment card information stored in a physical dummy payment card with another in accordance with at least one embodiment.

Referring to a diagram (a) of FIG. 6, after transferring the first virtual payment card information to physical dummy payment card 130, the user might select a second virtual payment card image in order to replace the first virtual payment card information with the second virtual payment card information. For example, the user makes a touch input on the second virtual payment card image as show in the diagram (a) of FIG. 6.

Referring to a diagram (b) of FIG. 6, the user drags or flicks the second virtual payment card image to output terminal 110 where physical dummy payment card 130 is coupled to. Such dragging input initiates an operation for transferring information on the second virtual payment card to physical dummy payment card 130. For example, when the dragged virtual payment card image reaches at a certain area close to output terminal 110, an edge of the selected virtual payment card image is started to be displayed by a dashed line as shown in the diagram (b) of FIG. 6.

Referring to a diagram (c) of FIG. 6, since the first virtual payment card information is already stored in physical dummy payment card 130, user equipment 100 may display a graphic user interface that enables a user to indicate other information stored in physical dummy payment card 130 and ask whether to replace or not (e.g., yes/no). As shown in the diagram (c) of FIG. 6, the user might make a touch input on a "no" button in order not to choose replacing the first virtual payment card information with the second virtual payment card information.

As shown in a diagram (d) of FIG. 6, upon the selection of the "no" icon, user equipment 100 starts displaying second virtual payment card image 600 with a dotted line and displays dynamic movement of second virtual payment card image 600 entering into an original position thereof which is displayed with a dotted line. Then, user equipment 100 displays second virtual payment card image 610 with a solid line which is same to other virtual card images as shown in a diagram (e) of FIG. 6.

FIG. 7 illustrates expiration of a valid period of a virtual payment card stored in a physical dummy payment card in accordance with at least one embodiment.

After first virtual payment card information is transferred to physical dummy payment card 130 coupled to the user equipment 100, user equipment 100 displays the first virtual payment card image with a dotted line, as shown in a diagram (a) of FIG. 7. When the valid period of the first virtual payment card information is expired, user equipment 100 displays dynamic movement of first virtual payment card image 700 coming out from physical dummy payment card 130 and entering into an original position of the first virtual payment card displayed with a dotted line, as shown in a diagram (b) of FIG. 7.

That is, when the valid period expires, the first virtual payment card information is removed or erased from physical dummy payment card 130. Then, user equipment 100 starts displaying first visual payment card 710 with a solid line which is same as others.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a magnetic data output controller and the magnetic data output controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. § 112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of generating a temporal physical payment card by user equipment including at least one hardware processor, the method comprising:
    obtaining, by the user equipment, information on a virtual payment card selected based on a selection input from a plurality of virtual payment cards stored in the user equipment;
    transferring, by the user equipment, the obtained information on the selected virtual payment card to a physical dummy payment card upon generation of a predetermined event;
    setting, by the user equipment, a valid period of the transferred virtual payment card information in response to a user input; and
    performing, by the user equipment, a control operation for invalidating the transferred virtual payment card information stored in the physical dummy payment card when the valid period of the transferred virtual payment card information expires,
    wherein the performing a control operation includes:
        in a case that the physical dummy payment card is configured to store the transferred virtual payment card information while power is supplied from the user equipment,
        interrupting supplying the power to the physical dummy payment card and easing the transferred virtual payment card information when the valid period of the transferred virtual payment card information expires.

2. The method of claim 1, wherein the obtaining information comprises:
    collecting information on the plurality of virtual payment cards stored in the user equipment;
    displaying images of the plurality of virtual payment cards on a display based on the collected information;
    receiving the selection input for selecting at least one of the displayed virtual payment card images; and
    retrieving information on the selected virtual payment card image from a memory of the user equipment.

3. The method of claim 1, wherein the transferring the obtained information comprises:
    determining whether the physical dummy payment card is coupled to the user equipment;
    displaying a message informing a user of disconnection when the physical dummy payment card is not coupled; and
    performing the transferring the obtained information to the physical dummy payment card when the physical dummy payment card is coupled.

4. The method of claim 1, wherein the transferring the obtained information comprises:
    determining whether the physical dummy payment card stores any virtual payment card information; and
    transmitting a control signal for erasing stored virtual payment card information to the physical dummy payment card when the physical dummy payment card stores virtual payment card information.

5. The method of claim 1, wherein the transferring the obtained information comprises:
    determining whether the physical dummy payment card stores any virtual payment card information;
    producing and displaying a graphic user interface that asks a user whether to replace the stored virtual payment card information with others; and
    transmitting a control signal for erasing stored virtual payment card information to the physical dummy payment card when receiving a user input for replacing the stored virtual payment card information; and
    transferring the obtained information to the physical dummy payment card.

6. The method of claim 1, comprising:
    performing an authentication process by producing and displaying a graphic user interface for asking a user to enter authentication information.

7. The method of claim 1, wherein the setting a valid period comprises:
    producing and displaying a graphic user interface that enables a user to select one of preset valid periods and to enter a customized valid period.

8. The method of claim 1, wherein the performing a control operation includes:
    transmitting a control signal for erasing the transferred virtual payment card information to the physical dummy payment card when the valid period of the transferred virtual payment card information expires.

9. User equipment of generating a temporal physical payment card, the user equipment comprising:
    an input/output circuit configured to receive user inputs from a user and to output graphic user interfaces produced as a result of executing applications in response to the received user inputs;
    a memory configured to store and manage information on virtual payment cards;
    an interface circuit configured to provide a data path to a physical dummy payment card in order to transfer information on at least one virtual payment card to the physical dummy payment card; and
    a processor configured (i) to obtain information on a virtual payment card selected from a plurality of virtual payment cards stored in the memory based on a selection input received from a user through the input/output circuit, (ii) to transfer the obtained information on the selected virtual payment card to the physical dummy payment card upon generation of a predetermined event, (iii) set a valid period of the transferred virtual payment card information in response to a user input; and (iv) to perform a control operation for invalidating the transferred virtual payment card information stored in the physical dummy payment card when the valid period of the transferred virtual payment card information expires, wherein the performing a control operation includes at least one of:

(i) transmitting a control signal for erasing the transferred virtual payment card information to the physical dummy payment card; and (ii) interrupting supplying power to the physical dummy payment card and erasing the transferred virtual payment card information, in a case that the physical dummy payment card is configured to store the transferred virtual payment card information while the power is supplied from the user equipment.

* * * * *